United States Patent Office 3,318,911
Patented May 9, 1967

---

3,318,911
METHOD OF PREPARING GAMMA-CYANO-BUTYRALDEHYDE ACETALS
Ryonosuke Yoshida, Masahiro Takehara, and Eiji Negoro, Kawasaki-shi, Kanagawa-ken, Japan, assignors to Ajinomoto Co., Inc., Tokyo, Japan
No Drawing. Filed Dec. 26, 1963, Ser. No. 333,612
Claims priority, application Japan, Dec. 28, 1962, 37/59,404
2 Claims. (Cl. 260—340.7)

The present invention relates to a method of preparing γ-cyanobutyraldehyde acetals.

The acetals of γ-cyanobutyraldehyde are useful intermediates in the synthesis of amino acids. The acetal group may be converted to the free formyl radical and further reacted according to Strecker's synthesis. The nitrile group may be converted to an amino group or to a carboxyl radical. It has been disclosed in U.S. Patent No. 2,688,023 that lysine and α-amino adipic acid may be prepared from γ-cyanobutyraldehyde acetals.

The known methods of preparing γ-cyanobutyraldehyde acetals are not well suited for adaptation to industrial practice. Their yields are low. They produce mixtures of isomers from which the γ-cyanobutyraldehyde acetals are isolated only with difficulty.

The object of the instant invention is a method which permits γ-cyanobutyraldehyde acetals to be prepared in good yields and in a simple manner.

We have found that γ-cyanobutyraldehyde acetals are obtained in good yields and free from by-products that require complex separation methods when the corresponding β-chloropropionaldehyde acetals are reacted with acetonitrile in the presence of alkali metal or of an alkali metal amide. All chloropropionaldehyde acetals which are commercially available or which are readily prepared by known methods may be used in the method of our invention.

Typical acetals of chloropropionaldehyde suitable for this purpose are the dimethyl, diethyl, diisopropyl, and dipropyl acetals. Useful starting materials are also obtained when the two lower alkyl radicals in these acetals are replaced by the radical of a dihydric alcohol, as in 2-β-chloroethyl-1.3-dioxolane and in 2-β-chloroethyl-4,4,6-trimethyl-1.3-dioxane.

The condensing reagents which may be employed in our invention include sodium, potassium, lithium, and the amides of these alkali metals. The reaction is performed in an inert liquid medium, such as liquid ammonia, a dialkyl ether or a cyclic ether.

In the reaction of the invention, substantially equimolecular amounts of chloropropionaldehyde acetal and acetonitrile are condensed in the presence of an approximately equimolecular amount of alkali metal or alkali metal amide. The alkali metal or alkali metal amide may be added to the solution of acetonitrile in the solvent, and the chloropropionaldehyde acetal may be added drop by drop to the mixture. The first step of this procedure may be reversed so that a solution or suspension of the alkali metal or alkali metal amide in the solvent is prepared first, and the acetonitrile is admixed thereto.

The reaction is exothermic. The reaction medium must be cooled to a temperature sufficiently low to avoid a violent reaction upon addition of the chloropropionaldehyde acetal, and the rate of reaction is controlled by adding the acetal slowly, with agitation, and with cooling.

If liquid ammonia is employed as a solvent, the reaction may be initiated at a temperature between —75° and —35° C., and the temperature may be permitted to rise to the range between —50° C. and +20° C. when the original reactants are partly consumed. In solvents which boil at a higher temperature than ammonia, the reaction rate is preferably controlled in such a manner that the reaction mixture remains below the boiling point of the solvent. Dioxane is a convenient solvent and permits operation at a reaction temperature between +10° C. and +30° C. depending on the reactivity of the acetal.

The solvent is removed by distillation from the reaction mixture after decomposition of any residual alkali metal or alkali metal amide. The product and unreacted chloropropionaldehyde acetal may also be separated from the solvent by extraction with a solvent which does not mix with the solvent employed for a condensation reaction. The crude γ-cyanobutyraldehyde acetal recovered may be further purified by fractionation in a vacuum.

The following examples are further illustrative of the present invention but it will be understood that the invention is not limited thereto.

EXAMPLE 1

0.5 gram ferric nitrate and 6.9 grams metallic sodium were added with stirring to 300 milliliters liquid ammonia while the temperature of the mixture was kept between —35° C. and —40° C. by external cooling. The resulting suspension of sodium amide in liquid ammonia was further cooled, and 16 grams acetonitrile were added drop by drop with vigorous stirring while the liquid medium was kept at a temperature between —40° C. and —60° C. Stirring continued for 80 minutes after the acetonitrile had been added. Then, 50 grams β-chloropropionaldehyde diethylacetal were added drop by drop with stirirng over a period of 50 minutes. Stirring of the reaction mixture continued for two hours, and the mixture was then permitted to stand overnight in a cooling mixture of Dry Ice and alcohol.

The ammonia was removed by distillation, and the residue was taken up in water. A small amount of insoluble material was removed by filtration. A layer of an oily liquid formed above the aqueous medium and was separated therefrom. The aqueous medium was extracted with ether, and the ether extract was combined with the oily liquid. The combined non-aqueous fractions were washed with water, and dried by means of anhydrous sodium sulfate.

The ether was distilled off, and the residue was fractionated in a vacuum. There were obtained 11 grams of unreacted β-chloropropionaldehyde diethylacetal (B.P. 40°–44.5° C. at 3 mm. Hg) and 30.1 grams γ-cyanobutyraldehyde diethylacetal (B.P. 82°–85° C. at 3 mm. Hg). The γ-cyanobutyraldehyde diethylacetal correspond to 75.3 percent of the β-chloropropionaldehyde acetal consumed. Upon redistillation, γ-cyanobutylaldehyde diethylacetal of analytical grade was obtained (B.P. 85.5° to 86.5° C. at 3 mm. Hg, $n_D^{21}$ 1.4253). The 2,4-dinitrophenylhydrazone of the redistilled material had a melting point of 118.5° C. (uncorrected). The hydrazone did not lower the melting point of the 2,4-dinitrophenylhydrazone of γ-cyanobutyraldehyde diethylacetal produced by conventional methods. The identity of the acetal was further established by elementary analysis:

Calculated for $C_9H_{17}NO_2$: C, 63.13; H, 10.00; N, 8.18. Found: C, 63.62; H, 10.21; N, 8.42.

EXAMPLE 2

27.7 grams β-chloropropionaldehyde dimethylacetal, 4.6 grams metallic sodium, 10.7 grams acetonitrile, and 500 milliliters liquid ammonia were combined in a manner analogous to the procedure of Example 1. When the reaction mixture obtained was fractionated, there were obtained 4.2 grams of the unreacted acetal (B.P. 37°–42° C. at 6–8 mm. Hg) and 12.3 grams γ-cyanobutyraldehyde dimethylacetal (B.P. 95°–95.5° C. at 7.5 mm. Hg, $n_D^{21}$ 1.4251). The yield was 50.7 percent, based on the acetal consumed. The 2,4-dinitrophenylhydrazone of the product melted at 117°–118.5° C. (uncorrected). It was identified by the unchanged melting point of a mixture with the same prepared by conventional methods.

EXAMPLE 3

When 1.4 grams metallic lithium were substituted for the metallic sodium employed in the method described in Example 2, and the procedure of that example was followed in all other respects, there were obtained 19.0 grams γ-cyanobutyraldehyde dimethylacetal (B.P. 82.0°–84.5° C. at 2.5–3 mm. Hg). The yield on the basis of the chloropropionaldehyde acetal consumed was 66.7 percent.

EXAMPLE 4

4.6 grams sodium were dissolved in 350 milliliters liquid ammonia. 15.7 milliliters acetonitrile were added drop by drop with stirring to the blue ammoniacal solution over a period of 15 minutes. Stirring was continued until the blue color had disappeared. 33.4 grams β-chloropropionaldehyde diethylacetal were then added drop by drop over a period of 20 minutes, and stirring continued at a temperature well below the boiling point of the ammonia for five hours.

The ammonia was removed from the reaction mixture by distillation, and water was added to the residue until it separated into an aqueous layer and an oily layer. The two layers were separated. The aqueous layer was extracted with ether, and the ether extract was added to the oily material. The ether was distilled off, and the residue was fractionated in a vacuum.

There were obtained 4.8 grams unreacted β-chloropropionaldehyde diethylacetal (B.P. 35°–40° C. at 2 mm. Hg) and 19.0 grams γ-cyanobutyraldehyde diethylacetal (B.P. 83°–84.5° C. at 2.5 mm. Hg). The yield γ-cyanobutyraldehyde diethylacetal was 64.7 percent of that theoretically expected.

EXAMPLE 5

14 milliliters acetonitrile were added drop by drop with stirring to a solution of 4.6 grams sodium powder in 200 milliliters dioxane while a temperature between 10 and 20° C. was maintained. When mixing was completed, stirring was continued for one hour, and 32 grams β-chloropropionaldehyde diethylacetal were added drop by drop over a period of 40 minutes. The reaction was completed while the mixture stood at room temperature for five hours.

A small amount of insoluble material was filtered off. The solvent was removed from the filtrate by distillation, and the residue was fractionated in a vacuum. There were obtained 13.9 grams of the unreacted β-chloropropionaldehyde diethylacetal (B.P. 47° C. at 5 mm. Hg) and 2.9 grams γ-cyanobutyraldehyde diethylacetal (B.P. 85°–88° C. at 3.5–4 mm. Hg, $n_D^{26}$ 1.4495). The yield was 16 percent, based on the acetal consumed.

EXAMPLE 6

A suspension of sodium amide in liquid ammonia was prepared from 250 ml. ammonia and 4.8 grams metallic sodium. 13.5 milliliters acetonitrile were added drop by drop with stirring while the temperature of the mixture was kept at −75° C. to −68° C. Stirring continued beyond the addition of the acetonitrile for 90 minutes. 39 grams β-chloropropionaldehyde diisopropylacetal were then added to the reaction mixture with stirring and cooling to −75° to −73° C. Stirring was continued for 4.5 hours, and the reaction mixture was worked up in the manner described in Example 1.

There were recovered 8.3 grams of the unreacted original acetal (B.P. 58.5° to 61.5° C. at 3.5 mm. Hg $n_D^{25}$ 1.4201) and 18.5 grams γ-cyanobutyraldehyde diisopropylacetal (B.P. 98° to 100.5° C. at 3.5 mm. Hg, $n_D^{25}$ 1.4250). The yield was 58.9 percent. The product when purified by redistillation had a boiling point of 95.5° to 96.5° C. at 2.5 mm. Hg, and a refractive index $n_D^{25}$ 1.4271. It was further identified by elementary analysis as follows:

Calculated for $C_{11}H_{21}O_2N$: C, 66.29; H, 10.62; N, 7.03, Found: C, 66.16; H, 10.85; N, 7.22.

EXAMPLE 7

A suspension of sodium amide in liquid ammonia was prepared from 250 milliliters ammonia and 5.1 grams metallic sodium. 15 milliliters acetonitrile were added drop by drop while the mixture was being stirred, and was externally cooled by a bath of Dry Ice and alcohol. Stirring continued 2.5 hours beyond addition of the acetonitrile whereupon 30 grams 2-β-chloroethyl-1.3-dioxolane were added in small portions over a period of 30 minutes. The mixture was permitted to stand for three hours in the refrigerating bath, and was then worked up as described in Example 1.

There were obtained 2.7 grams of the unreacted original acetal (B.P. 41° to 43° C. at 3 mm. Hg) and 13.4 grams 2-γ-cyanopropyl-1.3-dioxolane (B.P. 95° to 96° C. at 3 mm. Hg. $n_D^{30}$ 1.4410. The yield of 2-γ-cyanopropyl-1.3-dioxolane was 47.3 percent of the theoretical yield on the basis of the acetal consumed. When purified by redistillation, the product had a boiling point of 84.0° to 84.5° C. at 1.5 mm. Hg, and a refractive index of $n_D^{30}$ 1.4415. The elementary analysis was as follows:

Calculated for $C_9H_{11}O_2N$: C, 59.55; H, 7.85; N, 9.92. Found: C, 59.26; H, 7.90; N, 9.97.

EXAMPLE 8

A small amount of ferric nitrate and 8.9 grams metallic potassium were added with stirring to 350 milliliters liquid ammonia while the mixture was being cooled in a bath of Dry Ice and alcohol. 14 milliliters acetonitrile were added drop by drop to the potassium amide solution. After stirring for two hours, 33.4 grams β-chloropropionaldehyde diethylacetal were added to the reaction mixture drop by drop over a period of one hour, and the mixture was further processed as described in Example 1.

There were recovered 6.6 grams of the unreacted original acetal (B.P. 40° to 43° C. at 1.5 mm. Hg) and 16.6 g. γ-cyanobutyraldehyde diethylacetal (B.P. 83° to 85° C. at 1.5 mm. Hg, $n_D^{30}$ 1.4239). The yield of the product was 61 percent of that theoretically available from the acetal consumed.

Acetonitrile when reacted with alkali metal or alkali metal amide in a suitable solvent forms a metal acetonitrile in accordance with the equation.

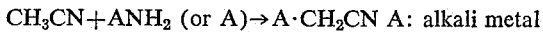

$CH_3CN + ANH_2$ (or A) → $A \cdot CH_2CN$   A: alkali metal

This salt when condensed with β-halopropionaldehyde acetal yields γ-cyanobutyraldehyde acetal.

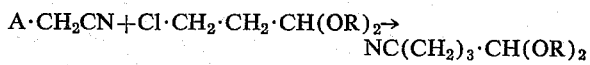

$A \cdot CH_2CN + Cl \cdot CH_2 \cdot CH_2 \cdot CH(OR)_2 \rightarrow$
$NC(CH_2)_3 \cdot CH(OR)_2$ While the invention has been described with particular reference to specific embodiments, it is to be understood that it is not limited thereto, but is to be construed broadly and restricted solely by the scope of the appended claims.

What we claim is:

1. A method of preparing a γ-cyanobutyraldehyde acetal, which comprises condensing acetonitrile with an approximately equimolecular amount of an acetal of β-chloropropionaldehyde having an alcohol moiety selected from the group consisting of lower alkanols and the divalent radicals of dioxolane and dioxane in an inert liquid reaction medium selected from the group consisting of liquid ammonia, dialkyl ether, and dioxane at a temperature between −75° C. and +30° C. in the presence of an approximately equimolecular amount of a condensing agent selected from the group consisting of the alkali metals sodium, potassium, and lithium, and the amides of said alkali metals.

2. A method as set forth in claim 1, wherein said acetonitrile is reacted first with said condensing agent, and the resulting reaction product is reacted with said acetal of β-chloropropionaldehyde.

No references cited.

CHARLES B. PARKER, *Primary Examiner.*

JOSEPH P. BRUST, *Assistant Examiner.*